(No Model.)

W. KUMMING & T. DOWDELL.
DETACHABLE SHAFT PULLEY OR COLLAR.

No. 461,501. Patented Oct. 20, 1891.

Witnesses:
M. E. Harnam
J. A. Herron

Inventor.
William Kumming
Thomas Dowdell

UNITED STATES PATENT OFFICE.

WILLIAM KUMMING AND THOMAS DOWDELL, OF PITTSBURG, PENNSYLVANIA.

DETACHABLE SHAFT PULLEY OR COLLAR.

SPECIFICATION forming part of Letters Patent No. 461,501, dated October 20, 1891.

Application filed February 6, 1891. Serial No. 380,533. (No model.)

*To all whom it may concern:*

Be it known that we, WILLIAM KUMMING and THOMAS DOWDELL, citizens of the United States, residing at Pittsburg, in the county of Allegheny and State of Pennsylvania, have invented certain new and useful Improvements in a Detachable Shaft Pulley or Collar; and we do hereby declare the following to be a full, clear, and exact description of the invention, such as will enable others skilled in the art to which it pertains to make and use the same, reference being had to the accompanying drawings, which form a part of this specification.

Our invention relates to an improved detachable pulley hub or collar for shafting; and it consists in certain details of construction, as will be fully described hereinafter.

Figure 1:
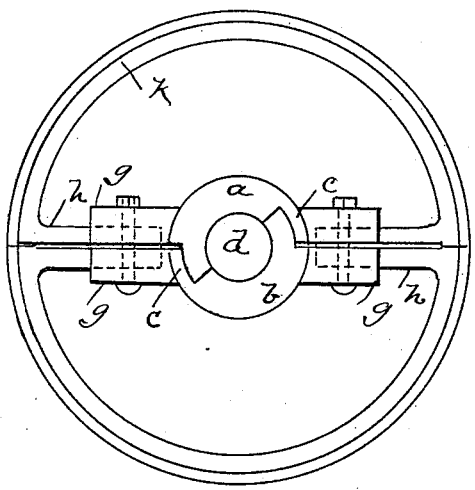
Figure 2:
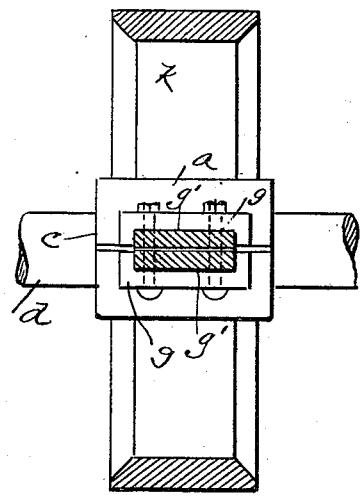
Figure 3:
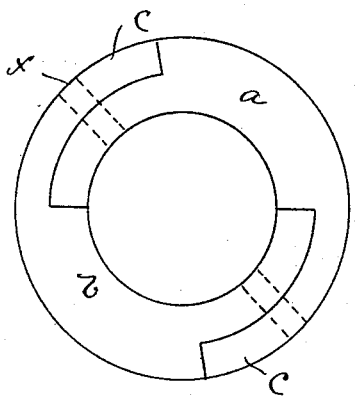
Figure 4:
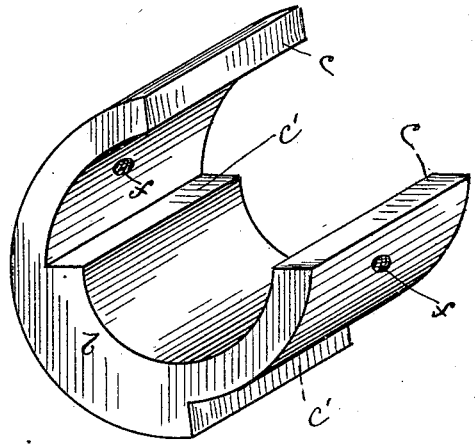

In the accompanying drawings, Figure 1 is a side elevation of a sectional pulley provided with our improved hub for clamping the same to a shaft. Fig. 2 is a sectional elevation of the same. Fig. 3 is a side elevation of a removable collar, being a modification of the hub of the above-described pulley. Fig. 4 is a perspective view of one of the sections of the collar.

To put our invention into practice and construct a pulley or collar that may be detached in sections from a shaft regardless of the bearings, we provide a hub consisting of two sections or members $a$ $b$. Each of these sections is provided with two integral curved flanges $c$ of less thickness than the body of the section, and there is thus formed on both the inner and outer surface of each member a seat $c'$. When the two sections are placed in position around a shaft, the ends of the flanges $c$ of one section or member bear against the seats $c'$ of the other section, and the two sections are tightly locked together by means of bolts, which pass through apertures $f$, formed in the flanges $c$ of the sections.

To adapt our improved collar for use as a hub of a sectional or other pulley, we attach to or make integral with each section at diametrically-opposite points the outwardly-extending arms $g$, (see Figs. 1 and 2,) each of which has one of its sides or faces grooved or recessed longitudinally, as at $g'$. When the two sections or members are locked or fastened together, the grooves or recesses $g'$ in the opposing faces of the arms $g$ align and form sockets, in which the inner ends of the spokes $h$ of the pulley are fitted. The spokes can be secured in said sockets by means of bolts or any other suitable fastening means.

Having thus described our invention, we claim—

1. A collar for shafting, comprising the two sections of substantially the same size, each of said sections being provided on its inner and outer surfaces with circularly-extending integral seats, and means for locking said sections around a shaft, substantially as shown and described.

2. The combination, in a collar for shafting, of two sections or members having the circularly-extending flanges of less thickness than the body and the integral seats on both surfaces thereof and bolts passing transversely through the flanges of the sections to lock the same firmly together when fitted one on the other and around a shaft, substantially as shown and described.

3. A hub for pulleys, comprising the two sections, each of which is provided on both its faces with an integral seat formed by circularly-extending flanges, said sections being also provided at diametric opposite points with radial arms, the opposing faces of which are recessed or grooved to form a socket, and means for locking the two sections together, substantially as shown and described, for the purpose specified.

In testimony that we claim the foregoing we hereunto affix our signatures this 31st day of January, A. D. 1891.

WILLIAM KUMMING. [L. S.]
THOMAS DOWDELL. [L. S.]

In presence of—
H. J. LEVIS,
JOHN F. BREEN.